United States Patent Office 2,910,515
Patented Oct. 27, 1959

2,910,515

ALKYLATION OF AROMATIC COMPOUNDS

John P. Luvisi, Park Ridge, and Louis Schmerling, Riverside, Ill., assignors to Universal Oil Products Company, Des Plaines, Ill., a corporation of Delaware No Drawing. Application October 24, 1958
Serial No. 769,322

20 Claims. (Cl. 260—671)

This invention relates to a process for the alkylation of aromatic compounds in the presence of a novel catalyst. More particularly, this invention relates to the alkylation of an alkylatable aromatic compound with an alkylating agent at alkylation conditions in the presence of an alkylation catalyst comprising boron, a group V(B) metal oxide, and a boron halide. Still more particularly, this invention relates to the alkylation of an alkylatable aromatic hydrocarbon with the alkylating agent at alkylation conditions in the presence of an alkylation catalyst comprising boron, a group V(B) metal oxide, and boron trichloride.

An object of this invention is to produce alkylated aromatic compounds and particularly to produce alkylated aromatic hydrocarbons. A specific object of this invention is the production of alkylated aromatic hydrocarbons boiling within the gasoline boiling range and having high anti-knock values thus being suitable for use as such or as components of gasoline. Another object of this invention is to produce aromatic compounds useful per se or as intermediates in the production of plastics, resins, and other organic materials. A specific object of this invention is the production of ethylbenzene, an intermediate for the manufacture of styrene, by the alkylation of benzene with ethylene in the presence of the disclosed catalysts. Another specific object of this invention is the production of cumene by the alkylation of benzene with propylene in the presence of these catalysts, which cumene product may then be oxidized to form cumene hydroperoxide which may be decomposed into phenol and acetone. Still another specific object of this invention is the production of alkylated phenols which may be utilized as antioxidants for preventing the deterioration of organic substances due to oxygen; for example, the alkylation of para-cresol with tertiary butyl alcohol to form 2,6-di-tertiary-butyl-4-methylphenol. Other objects of this invention will be set forth hereinafter as a part of the accompanying specification and examples.

One embodiment of the present invention relates to a process for the alkylation of an aromatic compound with an alkylating agent at alkylation conditions in the presence of an alkylation catalyst comprising boron, a group V(B) metal oxide, and a boron halide.

Another embodiment of the present invention relates to a process for the alkylation of an aromatic compound with an alkylating agent at alkylation conditions in the presence of an alkylation catalyst comprising boron, a group V(B) metal oxide, and boron trichloride.

A further embodiment of the present invention relates to a process for the alkylation of an aromatic hydrocarbon with an alkylating agent at alkylation conditions in the presence of an alkylation catalyst comprising boron, a group V(B) metal oxide, and boron trichloride.

A still further embodiment of the present invention relates to a process for the alkylation of a benzene hydrocarbon with an olefin at alkylation conditions in the presence of an alkylation catalyst comprising boron, a group V(B) metal oxide, and boron trichloride.

A specific embodiment of the present invention relates to a process for the alkylation of benzene with ethylene at a temperature of from about 100° C. to about 300° C. and at a pressure of from about 1 to about 200 atmospheres in the presence of an alkylation catalyst comprising boron, vanadium pentoxide, and boron trichloride.

Another specific embodiment of the present invention relates to a process for the alkylation of toluene with ethylene at a temperature of from about 100° C. to about 300° C. and at a pressure of from about 1 to about 200 atmospheres in the presence of an alkylation catalyst comprising boron, vanadium pentoxide, and boron trichloride.

A still further specific embodiment of the present invention relates to a process for the alkylation of toluene with propylene at a temperature of from about 100° C. to about 300° C. and at a pressure of from about 1 to about 200 atmospheres in the presence of an alkylation catalyst comprising boron, vanadium pentoxide, and boron trichloride.

The novel catalyst composition useful for the alkylation of aromatic compounds with alkylating agents at alkylation conditions is a physical mixture of boron, a group V(B) metal oxide, and a boron halide. None of these catalyst components alone is a catalyst for these reactions. For example, neither boron, or a group V(B) metal oxide, or boron chloride alone will catalyze aromatic alkylation reactions. Furthermore, physical mixtures comprising any two of the above components are also not catalysts for this reaction. It has been found that all three components are necessary to obtain satisfactory aromatic alkylation reactions. The boron utilized is a gray or black amorphous solid and is preferably utilized in pure form although it may contain minor amounts of various impurities. The group V(B) metal oxide utilized in the catalyst composition of the present invention may be selected from among the diverse metal oxides in various valence states including vanadium dioxide, vanadium trioxide, vanadium tetraoxide, vanadium pentoxide, niobium monoxide, niobium dioxide, niobium pentoxide, tantalum dioxide, tantalum tetraoxide, tantalum pentoxide, etc. Of these various oxides of group V(B) metals, the pentoxides are preferred, namely, vanadium pentoxide, niobium pentoxide, and tantalum pentoxide. The boron halide component of the catalyst composition preferably comprises boron trichloride, although boron trifluoride, boron tribromide, and boron triiodide may also be utilized, but not necessarily with equivalent results.

The preferred catalyst composition for the alkylation of an aromatic compound with an alkylating agent in accordance with the process of the present invention comprises a physical mixture of boron, vanadium pentoxide, and boron trichloride. In carrying out the process of the present invention, the amount of boron utilized will range from about 1 to about 50 mol percent based on the aromatic compound utilized. When utilizing an amount of boron within the above mentioned range, the amount of boron halide, particularly boron chloride, utilized will range from about 0.1 to about 10 mols per mol of boron. The third component, the group V(B) metal oxide, is then utilized in an amount of from about 0.01 to about 10 mols of metal oxide per mol of boron. The amount of boron specified hereinabove, namely from about 1 to about 50 mol percent, may appear to be high but in actuality, is small due to the low molecular weight of elemental boron. This amount of from about 1 to about 50 mol percent of boron when converted into weight percent based on the aromatic compound is from about 0.1 to about 5 weight percent and the amounts of the other catalyst components utilized are correspondingly small. Further exemplification of these quantities will be set forth hereinafter in the examples.

As hereinabove set forth, the present invention relates to a process for the alkylation of an alkylatable aromatic compound with an alkylating agent at alkylation conditions in the presence of a catalyst comprising boron, a group V(B) metal oxide, and a boron halide. Many aromatic compounds are utilizable as starting materials in this process. Preferred aromatic compounds are aromatic hydrocarbons, and particularly monocyclic aromatic hydrocarbons, that is, benzene hydrocarbons. Suitable aromatic compounds include aromatic hydrocarbons such as benzene, toluene, ortho-xylene, meta-xylene, para-xylene, ethylbenzene, 1,2,3-trimethylbenzene, ortho-ethyltoluene, meta-ethyltoluene, para-ethyltoluene, normal-propylbenzene, iso-propylbenzene, etc. Higher molecular weight alkyl aromatic hydrocarbons are also suitable starting materials such as those produced by the alkylation of aromatic hydrocarbons with olefin polymers. Such products are often referred to in the art as alkylates and include hexylbenzene, hexyltoluene, nonylbenzene, nonyltoluene, dodecylbenzene, dodecyltoluene, pentadecylbenzene, pentadecyltoluene, etc. Very often alkylate is obtained as a high boiling fraction, in which case the alkyl group attached to the aromatic hydrocarbon varies in size from $C_9$ to $C_{18}$. Other suitable, but not necessarily equivalent, alkylatable aromatic hydrocarbons include those containing an unsaturated side chain such as styrene, vinyltoluene, allylbenzene, etc. Still other suitable utilizable aromatic hydrocarbons include those with two or more aryl groups such as diphenyl, diphenylmethane, triphenylmethane, fluorene, stilbene, etc. Examples of suitable alkylatable aromatic compounds which contain condensed benzene rings include naphthalene, anthracene, phenanthrene, naphthacene, rubrene, etc.

Aromatic hydrocarbon derivatives which may be utilized as starting materials in the process of this invention include phenols, aromatic halogen compounds, aromatic carboxylic acids, aromatic ketones, etc. Examples of typical utilizable aromatic hydrocarbon derivatives include phenol, ortho-cresol, meta-cresol, para-cresol, ortho-chlorophenol, guiacol, ortho-hydroxydiphenol, para-hydroxydiphenol, ortho-cyclohexylphenol, para-cyclohexylphenol, catechol, resorcinol, hydroquinone, pyrogallol, hydroxyhydroquinone, etc., fluorobenzene, chlorobenzene, bromobenzene, ortho-chlorotoluene, meta-chlorotoluene, para-chlorotoluene, ortho-bromotoluene, ortho-bromoanisole, benzoic acid, ortho-toluic acid, meta-toluic acid, para-toluic acid, ortho-chlorobenzoic acid, para-hydroxybenzoic acid, gallic acid, phthalic acid, phthalic anhydride, isophthalic acid, terephthalic acid, phenylacetic acid, hydro-cinnamic acid, benzaldehyde, meta-tolualdehyde, para-tolualdehyde, salicylaldehyde, ortho-methoxy benzaldehyde, etc. By the term aromatic compound we mean to include not only benzene derivatives, naphthalene derivatives, and the like, but also all aromatic compounds containing a stable ring or nucleus such as is present in benzene, and which possess unsaturation in the sense that benzene does. Consequently, it can be seen that the term aromatic compound, in the sense in which it is used in the specification and appended claims, includes not only carbocyclic compounds but also heterocyclic compounds having a stable nucleus. The carbocyclic compounds may have a benzene, naphthalene, anthracene, etc. nucleus. The heterocyclic aromatic compounds may have a pyridine, furan, thiophene, pyrrole, pyrazole, etc. nucleus. In addition, the aromatic compounds contemplated for use in our process may contain both a carbocyclic and a heterocyclic ring such as is found in indole and carbazole. Also, the aromatic compounds may contain both a benzene nucleus and a cycloalkane nucleus such as is found in tetralin and in indan.

Suitable alkylating agents which may be charged in this process are olefin-acting compounds including monoolefins, diolefins, polyolefins, and also alcohols, ethers, esters, the latter including alkyl halides, alkyl phosphates, certain alkyl sulfates, and also esters of carboxylic acids. The preferred alkylating agents are olefin-acting compounds, particularly olefinic hydrocarbons which comprise monoolefins having one double bond per molecule and polyolefins which have more than one double bond per molecule. Monoolefins which may be utilized for alkylating aromatic compounds in accordance with the process of this invention in the presence of the hereinabove set forth catalyst are either normally gaseous or normally liquid and include ethylene, propylene, 1-butene, 2-butene, isobutylene, pentenes, hexenes, heptenes, etc. and higher boiling normally liquid olefins, the latter including various olefin polymers having from 6 to 18 carbon atoms per molecule. Cycloolefins such as cyclopentene, cyclohexene, and various alkyl cycloolefins, such as methylcyclopentene, methylcyclohexene, etc., may also be utilized but generally not under the same conditions of operation applying to the non-cyclic olefins. Polyolefinic hydrocarbons utilizable in the process of the present invention include conjugated diolefins, such as butadiene and isoprene, as well as non-conjugated diolefins and other polyolefinic hydrocarbons containing more than two double bonds per molecule. Alkylation of the above alkylatable aromatic compounds may also be effected in the presence of the hereinabove referred to catalyst by reacting the alkylatable aromatic compounds, particularly alkylatable aromatic hydrocarbons, with certain substances capable of producing olefinic hydrocarbons or intermediates which act as olefinic hydrocarbons, under the conditions of operation chosen for the process. Such substances include alkyl halides capable of undergoing dehydrohalogenation to form olefinic hydrocarbons and containing at least 2 carbon atoms per molecule. The alkyl halides comprise a particularly desirable group of alkylating agents which act as olefins in admixture with alkylatable aromatic compounds in the presence of the catalyst of the present invention. Suitable alkyl halides include ethyl chloride, ethyl bromide, n-propyl chloride, n-propyl bromide, iso-propyl chloride, iso-propyl bromide, n-butyl chloride, n-butyl bromide, iso-butyl chloride, iso-butyl bromide, sec-butyl chloride, sec-butyl bromide, tert-butyl chloride, tert-butyl bromide, amyl chlorides, amyl bromides, etc., the latter including the various isomeric forms of such compounds. Polyhaloalkanes which may be used include 1,3-dichloro-3-methylbutane, 1,1-dichloro-3,3-dimethylbutane, etc. Other suitable alkylating agents include alcohols, which can be dehydrated to form olefinic hydrocarbons containing at least 2 carbon atoms per molecule. Examples of such alcohols are ethyl alcohol, n-propyl alcohol, iso-propyl alcohol, n-butyl alcohol, iso-butyl alcohol, sec-butyl alcohol, tert-butyl alcohol, amyl alcohols, etc. As set forth hereinabove, ethers such as ethyl ether, anisole, etc., alkyl phosphates, and certain alkyl sulfates as well as esters of various carboxylic acids may also be utilized as alkylating agents. In each case, the olefinic hydrocarbons and the above mentioned olefin producing substances are herein referred to as alkylating agents.

In accordance with the process of this invention, the alkylation of alkylatable aromatic compounds reaction to produce alkylated aromatic compounds of higher molecular weight than the aromatic compounds charged to the process is effected in the presence of the above indicated catalyst at a temperature of from about room temperature to about 400° C. or higher, and preferably at a temperature of about 100° to about 300° C., although the exact temperature needed for a particular alkylation reaction will depend upon the specific reactants employed and upon the specific catalyst utilized.

The reaction is usually carried out at a pressure of about substantially atmospheric to about 100 atmospheres, and preferably under sufficient pressure to maintain the reactants and the products in substantially liquid phase, if possible. Referring to the alkylatable aromatic compound subjected to the alkylation reaction, it is preferable to have present from 1 to 10 or more, sometimes up to 20 molecular proportions of aromatic compound per one molecular proportion of alkylating agent introduced thereto, particularly olefinic hydrocarbon. The higher molecular ratios of aromatic compound to olefin are especially desirable when the olefin employed in the alkylation reaction is a higher molecular weight olefin boiling generally higher than pentenes, since these olefins frequently undergo depolymerization prior to or substantially simultaneously with alkylation so that one molecular proportion of such an olefin can alkylate two or more molecular proportions of the aromatic compound. The higher molecular ratios of aromatic compound to olefin also tend to reduce the formation of polyalkylated products because of the operation of the law of mass action under these conditions. In some cases, it may be desirable to maintain or employ an atmosphere of hydrogen or nitrogen within the reaction zone.

In converting aromatic compounds with the catalyst hereinabove described, either batch or continuous operations may be employed. The actual operation of the process can be varied depending upon the normal phase of the reacting constituents in such batch or continuous operation. As an example, an aromatic compound to be alkylated, for example, toluene, is brought to a temperature and pressure within the approximate range specified in the presence of a catalyst comprising a group V(B) metal oxide, such as vanadium pentoxide, and in the presence of boron and boron trichloride. The alkylation of the aromatic compound is then effected by the gradual introduction under pressure of an olefin such as ethylene in a manner to attain contact between the reactants and the catalyst. In carrying out the reaction in such a batch type operation, the amount of boron utilized ranges from about 0.1 to about 5% by weight of the aromatic compound to be alkylated. The amount of group V(B) metal oxide and boron halide to be utilized has been set forth hereinabove.

In another manner of operation, the aromatic compound may be mixed with an olefin at a suitable temperature and pressure. The catalyst comprising boron, vanadium pentoxide, and boron trichloride is added and the reaction of alkylation is induced by sufficiently long contact with the catalyst. The alkylation may be allowed to progress to different stages depending upon contact time although contact times of less than 0.5 hour and more than 10 hours are seldom employed. In the case of the alkylation of benzene, the best products are obtained or produced by the condensation of equimolecular quantities of the aromatic compound and olefin. After a batch treatment, the catalyst is removed in any suitable manner such as by filtration and/or washing with water to purify the organic product layer, which organic product layer may be subjected to fractionation for the recovery of desired reaction products. Unreacted starting materials recovered may be utilized again in the manner set forth above.

In one type of continuous operation, a liquid aromatic hydrocarbon such as toluene, together with a requisite amount of boron trichloride, may be pumped through a reactor containing boron and vanadium pentoxide in the form of a fixed bed. The alkylating agent may be added to the aromatic hydrocarbon stream just prior to contact of the stream with the boron and vanadium pentoxide bed or it may be introduced into multiple stages at various points in the bed. The details of continuous processes of this general character are familiar to those skilled in the art and any necessary additions or modifications of the above general procedure will be more or less obvious and can be made without departing from the generally broad scope of this invention. For example, instead of utilizing an amount of catalyst based on the weight of the compound to be alkylated, in continuous operation, the liquid hourly space velocity is varied so that the required contact between the catalyst and the reactants is obtained. In processes of this general character, liquid hourly space velocities, which are defined as the volume of liquid per volume of catalyst per hour, are normally from about 0.1 to about 10 or higher.

The process of the present invention is illustrated by the following examples which are introduced for the purpose of illustration and with no intention of unduly limiting the generally broad scope of the present invention.

The following experiments were all carried out in substantially the same manner. The experiments were performed in a rotatable high pressure autoclave to which the catalyst and reactants were charged. After closure, the autoclave was heated to the desired temperature and pressure and after the requisite period of time, cooled. Products from the reactor, gaseous liquid, and solid, were recovered and analyzed.

*Example I*

This example was carried out in the absence of any catalyst. 102 grams of toluene was added to the autoclave which was then flushed twice with nitrogen and pressured to 50 atmospheres with ethylene. The autoclave was then heated to 256° C. for 5.5 hours, during which time the pressure reached 144 atmospheres. On cooling to room temperature, the final pressure observed was 48 atmospheres indicating a pressure drop of 2 atmospheres of ethylene. After a recovery of unreacted toluene, 3 grams of ethylated toluenes were recovered.

*Example II*

In another experiment, an attempt is made to utilize boron alone for the reaction described in Example I. The addition of 3 grams of boron metal along with the toluene to the autoclave followed by closure, pressurizing with ethylene, and heating for the above stated period of time does not yield any noticeable increase in the amount of alkylate obtained.

*Example III*

In this example, 102 grams of toluene and 3 grams of vanadium pentoxide were charged to the autoclave. After closure the autoclave was pressured to 50 atmospheres with ethylene and heated to 250° C. for 5 hours. After cooling and separation of the reaction products, it was found that no more alkylation had occurred than occurs thermally as shown by Example I.

*Example IV*

This example illustrates the attempted use of boron trichloride alone as the catalyst. In this experiment, 102 grams of toluene was added to the autoclave, which was then cooled to —78° C. and 9 grams of boron trichloride added. The autoclave was closed and pressured to 50 atmospheres with ethylene. After heating for 5 hours at 250° C., during which time the pressure reached the maximum of 152 atmospheres, the autoclave was cooled and the products analyzed. The final pressure on the autoclave was 47 atmospheres, thus giving a pressure drop of 3 atmospheres. After removal of unreacted toluene, there was obtained 9 grams of higher boiling product, of which 8 grams were ethylene polymer and 1 gram was ethylated toluene.

*Example V*

In this example an attempt is made to utilize a physical mixture of boron and vanadium pentoxide as the catalyst for the reaction shown above. This combination of catalyst elements results in no more alkylation than was observed in the absence of any catalyst.

*Example VI*

In this experiment an attempt was made to utilize a physical mixture of boron and boron trichloride as a catalyst for the alkylation of toluene with ethylene. After addition of 100 grams of toluene and 2 grams of boron to the autoclave, it was cooled to —78° C. and 11.5 grams of boron trichloride was added. After closure, the autoclave was heated for 6 hours at 250° C., during which time a maximum pressure of 135 atmospheres was observed. After cooling, the final pressure on the autoclave was 47 atmospheres, indicating a pressure drop of 3 atmospheres. Recovery of the products and removal of the unreacted toluene showed that 9 grams of higher boiling material were obtained. Of this 9 grams, 4 grams were ethylene polymer and 5 grams were ethylated toluenes.

*Example VII*

Another experiment was carried out attempting to utilize a mixture of vanadium pentoxide and boron trichloride as the catalyst for the above reaction. In this experiment, 100 grams of toluene and 3 grams of vanadium pentoxide were added to the autoclave which was then cooled and 3 grams of boron trichloride added. The autoclave was pressured to 50 atmospheres with ethylene and then heated to 250° C. for the specified period of time. After cooling and removal of unreacted toluene the product was found to contain 2 grams of ethylated toluenes.

*Example VIII*

This example was carried out with the tri-component composition of this invention. In this example, 101 grams of toluene, 3 grams of boron, and 3 grams of vanadium pentoxide were added to the autoclave. After cooling, 9 grams of boron trichloride were added and the autoclave was closed. The autoclave was then pressured to 50 atmospheres with ethylene and heated to 250° C. and maintained at this temperature for 5.5 hours. The maximum pressure reached during the heating was 124 atmospheres and after cooling, the final pressure was 37 atmospheres indicating a pressure drop of 13 atmospheres. After removal of the products from the autoclave and recovery of unreacted toluene, it was observed that 22 grams of ethylated toluenes had been produced. Analysis of these 22 grams showed that they consisted of 15 grams of ethyltoluenes and 7 grams of diethyltoluenes. Thus, it is readily apparent that the 3 component catalyst system of the present invention is necessary to obtain the alkylation of aromatics reaction in an amount resulting in practical yields. Use of any less than these three components does not give the same results.

We claim as our invention:

1. A process for the alkylation of an aromatic compound with an alkylating agent at alkylation conditions in the presence of an alkylation catalyst comprising boron, an oxide of a metal selected from the group consisting of vanadium, niobium and tantalum, and a boron halide.

2. A process for the alkylation of an aromatic compound with an alkylating agent at alkylation conditions in the presence of an alkylation catalyst comprising boron, an oxide of a metal selected from the group consisting of vanadium, niobium and tantalum, and boron trichloride.

3. A process for the alkylation of an aromatic compound with an alkylating agent at alkylation conditions in the presence of an alkylation catalyst comprising boron, an oxide of vanadium, and boron trichloride.

4. A process for the alkylation of an aromatic compound with an alkylating agent at alkylation conditions in the presence of an alkylation catalyst comprising boron, an oxide of niobium, and boron trichloride.

5. A process for the alkylation of an aromatic compound with an alkylating agent at alklation conditions in the presence of an alkylation catalyst comprising boron, an oxide of tantalum, and boron trichloride.

6. A process for the alklation of an aromatic hydrocarbon with an alkylating agent at alkylation conditions in the presence of an alkylation catalyst comprising boron, an oxide of a metal selected from the group consisting of vanadium, niobium and tantalum, and boron trichloride.

7. A process for the alkylation of an aromatic hydrocarbon with an alkylating agent at alkylation conditions in the presence of an alkylation catalyst comprising boron, an oxide of vanadium, and boron trichloride.

8. A process for the alkylation of an aromatic hydrocarbon with an alkylating agent at alkylation conditions in the presence of an alkylation catalyst comprising boron, an oxide of niobium, and boron trichloride.

9. A process for the alkylation of an aromatic hydrocarbon with an alkylating agent at alkylation conditions in the presence of an alkylation catalyst comprising boron, an oxide of tantalum, and boron trichloride.

10. A process for the alkylation of a benzene hydrocarbon with an alkylating agent at alkylation conditions in the presence of an alkylation catalyst comprising boron, an oxide of a metal selected from the group consisting of vanadium, niobium and tantalum, and boron trichloride.

11. A process for the alkylation of a benzene hydrocarbon with an alkylating agent at alkylation conditions in the presence of an alkylation catalyst comprising boron, an oxide of vanadium, and boron trichloride.

12. A process for the alkylation of a benzene hydrocarbon with an alkylating agent at alkylation conditions in the presence of an alkylation catalyst comprising boron, an oxide of niobium, and boron trichloride.

13. A process for the alkylation of a benzene hydrocarbon with an alkylating agent at alkylation conditions in the presence of an alkylation catalyst comprising boron, an oxide of tantalum, and boron trichloride.

14. A process for the alkylation of a benzene hydrocarbon with an olefin at a temperaure of from about 50° C. to about 350° C. and at a pressure of from about 1 to about 200 atmospheres in the presence of an alkylation catalyst comprising boron, an oxide of a metal selected from the group consisting of vanadium, niobium and tantalum, and boron trichloride.

15. A process for the alkylation of a benzene hydrocarbon with an olefin at a temperature of from about 50° C. to about 350° C. and at a pressure of from about 1 to about 200 atmospheres in the presence of an alkylation catalyst comprising boron, vanadium pentoxide, and boron trichloride.

16. A process for the alkylation of a benzene hydrocarbon with an olefin at a temperature of from about 50° C. to about 350° C. and at a pressure of from about 1 to about 200 atmospheres in the presence of an alkylation catalyst comprising boron, niobium pentoxide, and boron trichloride.

17. A process for the alkylation of a benzene hydrocarbon with an olefin at a temperature of from about 50° C. to about 350° C. and at a pressure of from about 1 to about 200 atmospheres in the presence of an alkylation catalyst comprising boron, tantalum pentoxide, and boron trichloride.

18. A process for the alkylation of benzene with ethylene at a temperature of from about 100° C. to about 300° C. and at a pressure of from about 1 to about 200 atmospheres in the presence of an alkylation catalyst comprising boron, vanadium pentoxide, and boron trichloride.

19. A process for the alkylation of toluene with ethylene at a temperature of from about 100° C. to about 300° C. and at a pressure of from about 1 to about 200 atmospheres in the presence of an alkylation catalyst comprising boron, vanadium pentoxide, and boron trichloride.

20. A process for the alkylation of toluene with propylene at a temperature of from about 100° C. to about 300° C. and at a pressure of from about 1 to about 200 atmospheres in the presence of an alkylation catalyst comprising boron, vanadium pentoxide, and boron trichloride.

References Cited in the file of this patent

UNITED STATES PATENTS

| | | |
|---|---|---|
| 2,404,788 | Burk et al. | July 30, 1946 |
| 2,728,757 | Field et al. | Dec. 27, 1955 |
| 2,773,921 | Rylander et al. | Dec. 11, 1956 |
| 2,858,349 | Linn | Oct. 28, 1958 |